Dec. 6, 1960   T. CARRIGAN   2,962,980
RUNWAY FOR AUTOMOTIVE VEHICLES
Filed July 27, 1956   3 Sheets-Sheet 1
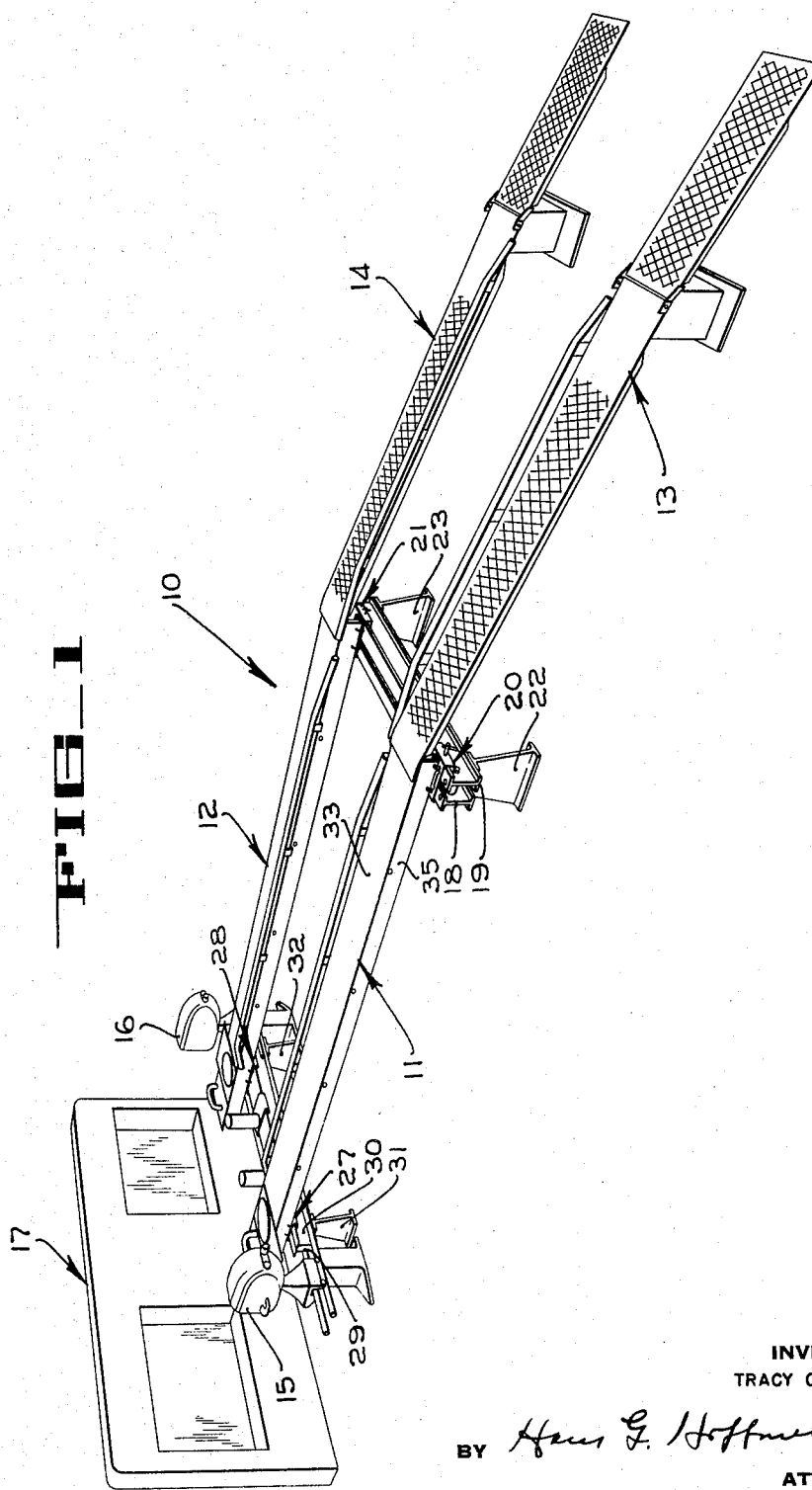
INVENTOR
TRACY CARRIGAN
BY Hans G. Hoffmeister.
ATTORNEY

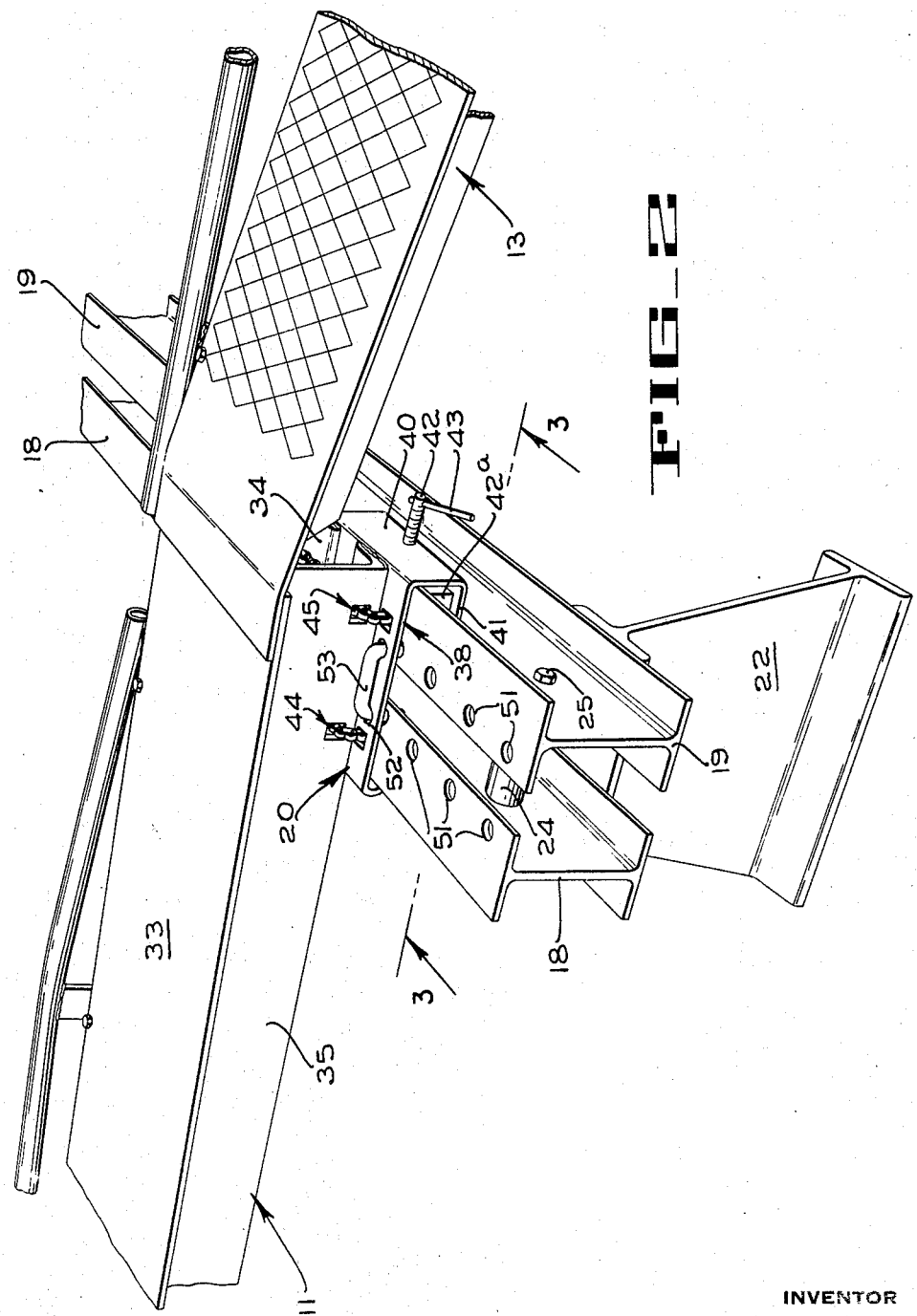

Dec. 6, 1960 T. CARRIGAN 2,962,980
RUNWAY FOR AUTOMOTIVE VEHICLES
Filed July 27, 1956 3 Sheets-Sheet 3
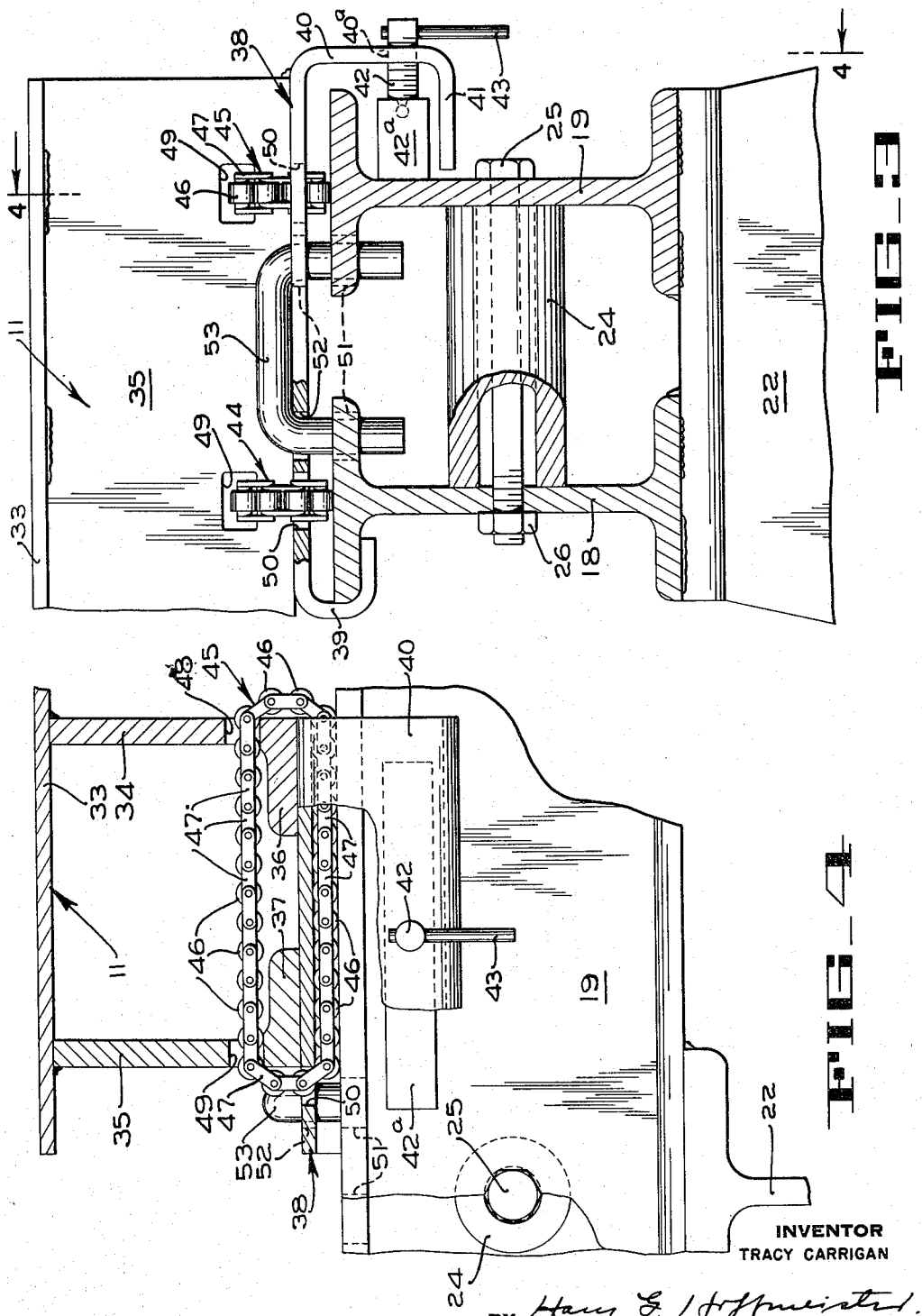
INVENTOR
TRACY CARRIGAN
BY *Hans E. Hoffmeister*
ATTORNEY

United States Patent Office 2,962,980
Patented Dec. 6, 1960

2,962,980

RUNWAY FOR AUTOMOTIVE VEHICLES

Tracy Carrigan, Lansing, Mich., assignor to Food Machinery and Chemical Corporation, San Jose, Calif., a corporation of Delaware Filed July 27, 1956, Ser. No. 600,453

1 Claim. (Cl. 104—33)

This invention pertains to improvements in equipment for servicing automotive vehicles and more particularly relates to a mounting for vehicle supporting runways of wheel aligning devices, or the like, to permit their lateral adjustment relative to each other to accommodate vehicles having different lateral spacing between their wheels.

The invention also finds particular utility in supporting the vehicle supporting runways of car service lifts of the type customarily installed in service stations for lubrication purposes.

In the process of aligning the wheels of an automobile, for example in the manner described in U.S. Patent No. 2,601,262, entitled "Method of and Apparatus for Measuring Alignment Characteristics of Front and Rear Wheels," issued on June 24, 1952, the automobile is customarily driven upon two parallel wheel supporting runways extending normal to a projection screen unit and the various aligning measurements and adjustments are made with the automobile thus disposed. In view of the increasing popularity in this country of sports cars and small foreign cars which have a relatively narrow lateral wheel spacing, or vehicle tread, as compared to the relatively wide standard tread of American cars, it has become necessary to provide runways which may be easily adjusted horizontally in order to accommodate both types of vehicles. It has also been found desirable, as disclosed in said patent, to be able to move the runways relative to their support while the vehicle is resting thereon in order to align the axis of the vehicle perpendicular to the projection screen unit to compensate for any slight misalignment of the vehicle relative to the runways when being driven thereon, and to thereafter lock the runways in the desired position.

It is therefore an object of this invention to provide a simple and inexpensive supporting structure for vehicle wheel supporting runways to permit lateral adjustment of the runways relative to each other and to thereafter lock the runways in their desired position.

Another object of the invention is to provide a device permitting each of two parallel wheel supporting runways to be easily moved laterally independently of the other.

Another object of the invention is to provide a supporting structure for a vehicle supporting runway which permits easy limited lateral adjustment of one end of the runway relative to the other to permit alignment of a vehicle supported thereon.

These and other objects and advantages of the present invention will become apparent from the following description and accompanying drawings in which:

Fig. 1 is a perspective view of a device embodying the principles of the invention.

Fig. 2 is a fragmentary perspective view of a portion of the device illustrated in Fig. 1 and drawn to an enlarged scale.

Fig. 3 is a fragmentary side elevation of one of the support assemblies taken generally on line 3—3 of Fig. 2 with certain parts broken away in order to show details therebehind.

Fig. 4 is a vertical section taken generally on line 4—4 of Fig. 3.

The wheel aligning installation 10 illustrated in Fig. 1 comprises two wheel supporting runways 11 and 12 and two ramps 13 and 14 leading up from the floor to the rear ends of said runways. Two optical wheel aligning heads 15 and 16 are mounted adjacent the forward ends of the runways 11 and 12, respectively, and are adapted to project suitable charts and light beams on a screen unit 17 to indicate the alignment characteristics of the wheels of a vehicle supported on the runways 11 and 12 in the manner fully described in the above cited Patent No. 2,601,262.

The rear ends of the runways 11 and 12 are supported on a pair of transversely extending I-beams 18 and 19 by supporting assemblies generally indicated at 20 and 21, respectively. The opposite ends of the I-beams 18 and 19 rest on and are secured to, as by welding, a pair of pedestals 22 and 23 which in turn are secured to the floor. The I-beams 18 and 19 are held in parallel spaced relation with each other by spacer blocks 24 (Fig. 3) extending between the webs thereof and bolts 25 which extend through the blocks 24 and suitable apertures in the webs, and are secured by nuts 26. The front ends of the runways 11 and 12 are similarly supported by assemblies 27 and 28 (Fig. 1) on I-beams 29 and 30 which rest on pedestals 31 and 32.

Since the four supporting assemblies 20, 21, 27 and 28 are either identical with, or mirror images of each other, only the assembly 20 which supports the rear end of the runway 11 will be described in detail. Referring to Figs. 2, 3 and 4, the runway 11 comprises an upper flat plate 33 fixed to the upper ends of the vertical flanges of two L-shaped members 34 and 35. The horizontal flanges 36 and 37 at the bottom of the vertical flanges of the members 34 and 35 extend toward each other. Adjacent the rear ends of the members 34 and 35 is a flat plate 38 (Fig. 4) which is fixed to the lower surfaces of the horizontal flanges 36 and 37. One side edge of the plate 38 is flush with the outer surface of the member 34 and the opposite side edge extends beyond the outer surface of the member 35 for purposes which will presently become apparent.

The forward end 39 (Fig. 3) of the plate 38 is bent downwardly and then rearwardly to hook over the forward edge of the upper flange of the I-beam 18 in the manner shown in Fig. 3. Similarly, the rear edge of the member 38 is provided with an integrally formed depending vertical flange 40 terminating in an inwardly extending flange 41. A screw 42 is threaded through a suitable tapped opening 40a in the flange 40 and is provided with a handle 43 at its outer end. The inner end of the screw 42 is rotatably connected to a brake block 42a which is adapted to frictionally engage the outer surface of the web portion of the I-beam 19 to lock the runway 11 against movement relative to the I-beams 18 and 19.

The bottom run of an endless roller chain 44 is interposed between the lower surface of the plate 38 and the upper surface of the I-beam 18. Similarly, the bottom run of an endless roller chain 45 is interposed between the lower surface of the plate 38 and the upper surface of the I-beam 19. The chains 44 and 45 are identical in construction and, as can best be seen in Fig. 4, chain 45 comprises a plurality of rollers 46 which are disposed with their axes parallel to each other, and are connected together by a plurality of chain links 47 which are smaller in width than the diameter of the rollers. The chains extend upwardly around the inner side edge of the plate 38 and the inner surface of the member 34, through suitable openings 48 and 49 in the vertical flanges of the members 34 and 35, and downwardly through openings 50 in the extended portion of the outer end of the plate 38. In this manner the weight on the runway 11 is distributed over a plurality of roller bearing points, thus facilitating the movement of the runway, even when a vehicle is resting thereon.

The lock device described above is sufficient to hold the runway when a vehicle is merely resting thereon, but in order to positively prevent shifting of the runway as a vehicle is driven thereon, positive locking means is provided in the form of a plurality of spaced holes 51 (Fig. 2), which are adjacent the inner edge of the upper flange of each of the I-beams 18 and 19, and a pair of holes 52 in the extended portion of the plate 38 adapted to be selectively registered with the holes 51. A U-shaped lock member 53 (Fig. 3) is adapted to be positioned with its leg portions extending through the holes 52, and the particular holes 51 selectively registered therewith, to positively prevent lateral movement of the runway 11 relative to the I-beams 18 and 19.

In the use of the device, the lock members 53 on each of the supporting devices 20, 21, 27 and 28 are removed and the runways 11 and 12 are positioned at a distance spaced from each other commensurate with the width of the tread of the vehicle to be driven thereon and the locks 53 are reinserted. The ramps 13 and 14 merely rest on and are not fixed to the floor and are thus movable along with the runways 11 and 12. After the vehicle has been driven onto the runways 11 and 12, the locks 53 are again removed and final positioning of the vehicle is accomplished in the manner described in the above-mentioned patent to Carrigan. The runways 11 and 12 are then locked in their final adjusted position by turning the screws 42 on each of the supporting assemblies 20, 21, 27 and 28 to lock the brake blocks 42a against their associated I-beam.

From the foregoing description, it is evident that I have provided a structure whereby two vehicles supporting runways may be easily and quickly adjusted relative to each other to accommodate vehicles having different tread widths, and wherein the runways may be shifted relative to their supporting structure after the vehicle has been driven thereon in order to accurately position the vehicle for purposes of checking the alignment of its wheels, or the like.

While I have shown and described one form of the invention, it is obvious that various changes may be made therein without departing from the spirit of the invention as defined by the appended claim.

Having thus described my invention, what I claim and desire to secure by Letters Patent is:

In a device of the character described, the combination comprising a vehicle supporting runway, a fixed support for said runway having a vertical portion and an upper horizontal portion provided with a flat upper surface, said horizontal portion having one edge projecting laterally from said vertical portion on one side thereof, a flat plate fixed to the under surface of said runway, a downwardly and inwardly turned flange on one edge of said plate hooking over said projecting edge of the horizontal portion of said support, a downwardly depending flange on the opposite edge of said plate projecting downwardly and spaced outwardly of the opposite edge of the horizontal edge of said support, and friction lock means connected to said depending flange and adapted to be moved from a position out of contact with said support into frictional contact with the vertical portion of said support to prevent movement of said plate relative to said support.

References Cited in the file of this patent
UNITED STATES PATENTS

| | | |
|---|---|---|
| 1,526,841 | Diffenderfer et al. | Feb. 17, 1925 |
| 2,664,970 | Warshaw | Jan. 5, 1954 |
| 2,755,554 | MacMillan | July 24, 1956 |
| 2,762,662 | Sloyan | Sept. 11, 1956 |